United States Patent [19]

Bradley, Jr.

[11] Patent Number: 4,579,694
[45] Date of Patent: Apr. 1, 1986

[54] WET DECK FILL

[75] Inventor: Wilson E. Bradley, Jr., Ellicott City, Md.

[73] Assignee: Evapco, Inc., Baltimore, Md.

[21] Appl. No.: 566,602

[22] Filed: Dec. 29, 1983

[51] Int. Cl.$^4$ .............................................. B01F 3/04
[52] U.S. Cl. ..................... 261/112; 165/60; 165/900; 261/DIG. 11; 428/182
[58] Field of Search ............ 261/112, 79 A, DIG. 11; 165/60, 166, DIG. 1; 210/150; 428/182, 184, 186

[56] References Cited

U.S. PATENT DOCUMENTS

| | | | |
|---|---|---|---|
| 2,042,127 | 5/1936 | Sayles | 261/112 |
| 2,596,642 | 5/1952 | Roestad | 261/112 X |
| 2,783,982 | 3/1957 | Kahl | 261/112 X |
| 2,793,017 | 5/1957 | Lake | 261/112 |
| 2,917,292 | 12/1959 | Hittrich | 261/112 X |
| 2,977,103 | 3/1961 | Smith et al. | 261/111 |
| 2,986,379 | 5/1961 | Kramig, Jr. | 261/112 X |
| 3,132,190 | 5/1964 | Engalitcheff, Jr. | 261/30 |
| 3,281,307 | 10/1966 | Moeller et al. | 261/112 X |
| 3,395,903 | 8/1968 | Norback et al. | 261/112 |
| 3,415,502 | 12/1968 | Munters | 261/112 |
| 3,442,494 | 5/1969 | Engalitcheff, Jr. et al. | 261/29 |
| 3,526,393 | 9/1970 | Meek | 261/112 X |
| 3,540,702 | 11/1970 | Uyama | 261/112 |
| 3,618,778 | 11/1971 | Benton et al. | 261/112 X |
| 3,733,063 | 5/1973 | Loetel et al. | 261/112 |
| 3,801,419 | 4/1974 | Meek | 261/112 X |
| 3,804,389 | 4/1974 | Engalitcheff, Jr. et al. | 261/111 |
| 3,963,810 | 6/1976 | Holmberg et al. | 261/112 |
| 3,965,225 | 6/1976 | Schinner | 261/79 A |
| 3,994,999 | 11/1976 | Phelps | 261/112 X |
| 3,997,635 | 12/1976 | Hallgren | 261/112 X |
| 4,218,408 | 9/1980 | Henning et al. | 261/112 |
| 4,390,481 | 6/1983 | Ernst et al. | 261/112 |

FOREIGN PATENT DOCUMENTS

| | | | |
|---|---|---|---|
| 1226259 | 3/1971 | United Kingdom | 261/112 |
| 1320500 | 6/1973 | United Kingdom | 261/112 |

Primary Examiner—Richard L. Chiesa
Attorney, Agent, or Firm—Panitch Schwarze Jacobs & Nadel

[57] ABSTRACT

A wet deck fill sheet is disclosed for use in making a wet deck fill for use in evaporative counterflow heat exchangers. One aspect of the sheet is that it includes transverse corrugations formed in at least one of the top and bottom edges of the sheet. Another aspect is the provision of a staggered array of substantially vertical spacers extending from one face of the sheet to space the sheet a predetermined distance from an adjacent sheet in the wet deck fill. The spacers are aligned to provide for substantially equalized air flow along the length of the sheet in a horizontal direction between the sheets as the air travels upward through the deck. Another aspect of the invention includes providing in the sloping walls of the major face corrugations formed in the fill sheets a plurality of substantially horizontal air turbulence increasing and water spreading means to increase the interaction of air and water to provide improved thermal performance.

13 Claims, 9 Drawing Figures

WET DECK FILL

BACKGROUND OF THE INVENTION

The present invention relates to a novel wet deck fill preferably made from a light weight thermoformed plastic material. The wet deck fill includes a plurality of adjacent wet deck fill sheets made in accordance with the present invention.

The wet deck fill is used as heat transfer media in evaporative type counterflow heat exchanger apparatus, such as cooling towers, which are used primarily to cool water for such applications as air conditioning, food processing and numerous other industrial processes.

One example of a general prior art wet deck fill arrangement disclosing how it is used in evaporative heat exchange apparatus is illustrated and described in U.S. Pat. No. 3,442,494, issued May 6, 1969 to Engalitcheff, Jr., et al., including the present inventor. The wet deck fill sheets in this patent are made of sheet metal and are fairly typical of prior art wet deck fill. In more recent years, wet deck fill has been made of thermoplastic polymeric resins having horizontal corrugations, but they have not had the structural integrity and are not of a suitable design to most efficiently be manufactured and used to provide optimal thermal performance to achieve a maximum air-water contact area and dwell time, while maintaining low air pressure drop characteristics.

The state of the prior art can best be described by reference to the following U.S. patents.

Pat. No. 2,793,017 issued May 21, 1957 to Lake is believed to be the closest prior art known to the inventor. This patent discloses wet deck fill comprising sheets having longitudinal corrugations and short, transverse corrugations extending from the top and bottom edges of the sheet to the top and bottom longitudinal corrugations, respectively. In addition, vertical spacing ribs are disposed in a staggered arrangement and extend from the front face of the sheet. When the sheets are assembled to form a wet deck fill section, the transverse edge corrugations of one sheet contact the transverse edge corrugations of the adjacent sheets to form a honeycomb arrangement at the top and bottom of the fill section. This arrangement adversely affects the water distribution on the surfaces of the sheets. Further, this arrangement increases the air pressure drop compared both to the present invention and to prior art fill sheets having uncorrugated top and bottom edges.

The following U.S. patents disclose various types of spacing means associated with wet deck fill sheets to keep the sheets separated by a predetermined distance.

Pat. No. 2,596,642, issued May 13, 1952 to Roestad, discloses sheets having corrugated edges. A plurality of stiffening spacers called ridges are formed in the sheets. The spacer ridges are vertically aligned or extend almost the full height of the sheets.

Pat. No. 3,132,190, issued May 5, 1964 to Engalitcheff, Jr., discloses the use of spacer strips which hang from the top of wet deck fill sheets. The longitudinal corrugations of the fill sheets bear against the spacer strips and are thereby separated from each other.

Pat. Nos. 3,540,702, issued Nov. 17, 1970 to Uyama, 3,733,063, issued May 15, 1973 to Loetel, et al., 3,963,810, issued June 15, 1976 to Holmberg, et al., and 3,994,999, issued Nov. 30, 1976 to Phelps, all disclose spacing means including substantially circular projections extending from the front face of the wet deck fill sheets. The spacer elements bear against certain portions of the rear face of adjacent sheets to maintain the desired distance between the sheets. The Phelps patent also discloses an embodiment of a wet deck fill in which the sheets are aligned so that the longitudinal corrugations extend vertically, rather than horizontally. In this embodiment, the sheets are spaced from each other by flat, horizontally disposed spacer elements located between the sheets at the top and bottom of the fill.

Pat. No. 3,804,389, issued Apr. 16, 1974 to Engalitcheff, Jr., et al., including the present inventor, discloses the use of several wet deck fill layers disposed one above the other. Each of the layers is very short in height and includes a single concavo-convex curved portion between upper and lower marginal portions, and has a total height of about 4-¼ to 4-½ inches. Extending from the concave side of the sheet, including the margin areas, are several spacing tabs. The tabs bear against the convex surface, again including the margins, to space the fill sheets from each other.

Pat. No. 3,965,225, issued June 22, 1976 to Schinner, discloses a wet deck fill comprising aligned, corrugated fill sheets which include a number of spacer-turbulators consisting of a series of mounds having a peak and crest at each corrugation. The spacer-turbulators extend substantially the full height of each of the sheets. The top of the crests bear against the concave portion of the adjacent fill sheet to keep the fill sheets spaced apart.

The following U.S. patents relate to modifications made to wet deck fill sheets in an effort to improve water distribution on both the front and rear faces of the sheets. Pat. No. 2,042,127, issued May 26, 1936 to Sayles, discloses a wet deck fill comprising fill sheets having angled tongues formed on the upper edges. Alternate tongues are angled in opposite directions so that water hitting one tongue is directed to one side of the sheet and water hitting the adjacent tongue is directed to the other face of the sheet. Provisions are also made for interlocking superimposed layers of fill material with each other. The interlocking occurs by having slots formed on the bottom of one fill layer interlocked between adjacent tongues on the top of the next lower fill layer.

Pat. No. 2,783,982, issued Mar. 5, 1957 to Kahl, is similar to the Sayles patent in that clip members are provided for securing separate alternating angled tongues on the top of fill sheets.

Pat. Nos. 3,415,502, issued Dec. 10, 1968 to Munters, and 4,218,408, issued Aug. 19, 1980 to Henning, et al., disclose other embodiments of wet deck fill sheets having various types of corrugations.

None of the above-described prior art provides the advantages of the present invention. The wet deck fill using wet deck fill sheets made according to the present invention overcomes the problems of the prior art and provides a surprising result in improved air pressure drop characteristics and thermal performance, including maximizing air-water contact area and dwell time. The fill has a high structural strength without increasing the weight of the fill. Moreover, wet deck fill sheets of the present invention can be manufactured at low costs.

Other advantages of the present invention and various comparisons of the present invention with prior art wet deck fill will be set forth hereinafter.

SUMMARY OF THE INVENTION

There are at least two primary novel aspects of the wet deck fill sheets made in accordance with the present invention. One primary aspect of the present invention includes a wet deck fill sheet comprising a wet deck fill sheet comprising a sheet of material having front and rear major faces, top and bottom edges and side edges, the major faces having major face corrugations formed therein generally parallel to the top and bottom edges, at least one of the top and bottom edges having transverse corrugations formed therein transverse to the major face corrugations, the transverse corrugations having an amplitude such that they would extend from the major faces from about 15 percent to about 35 percent of the distance between adjacent sheets when the sheets are assembled to form a wet deck fill.

A second primary aspect of the present invention includes a wet deck fill sheet comprising a wet deck fill sheet comprising a sheet of material having front and rear major faces, top and bottom edges and side edges, the major faces having major face corrugations formed therein generally parallel to the top and bottom edges, each major face corrugation comprising sloping walls adjoining an adjacent peak and valley, a plurality of substantially vertical spacing means extending from the front face for spacing the sheet a predetermined distance from an adjacent wet deck fill sheet, some of the spacing means being in spaced horizontal alignment, each spacing means being out of vertical alignment with a vertically adjacent spacing means, whereby the flow of air between adjacent sheets may be substantially equalized along the length of the sheet in a horizontal direction as the air flows from the bottom edge to the top edge of the sheet.

Another aspect of the present invention relates to a wet deck fill sheet as set forth above, further including air turbulence increasing and water spreading means formed on the sloping walls for increasing the turbulence of air and water as the air travels past the major surfaces and for spreading the water along the length of the major surfaces.

Each aspect of the present invention is responsible for important advantages associated with the present invention. The transverse corrugations along the top edge serve to more uniformly distribute on both major faces of the sheet the water which is usually cooled (although the heat exchanger could be used to heat the water as well) in the heat exchanger. The transverse corrugations along the bottom edge serve to prevent water sheeting and consequent air damming by separating the water as it leaves the sheets into a number of separate streams. Further details concerning this important aspect will be described in detail below.

The novel spacing means extending from the front face of the sheets provide a very strong structure in which both the water spray and countercurrent air flow are allowed to extend across the length of the sheets. This results in a better air-water contact for more efficient heat transfer. Further details of the advantages associated with the spacing means also will be set forth below.

The air turbulence increasing and water spreading means, preferably in the form of corrugations having a small amplitude and frequency compared to the amplitude and frequency of the major face corrugations, provide a sufficient obstruction to cause slightly increased air turbulence between the sheets at the air-water interface for improved heat transfer and evaporation, but do not create such an obstruction that the water flow and air flow are adversely affected. These means also spread or redistribute the water as it travels down the faces of the sheet to eliminate dry spots. Further advantages of this aspect of the present invention will become apparent hereinafter.

A preferred wet deck fill sheet includes all of the above-described aspects. This provides a superior wet deck fill with excellent heat transfer capacity. The fill is strong, durable and less expensive to manufacture and transport than prior art fill.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENT

Figure 1:
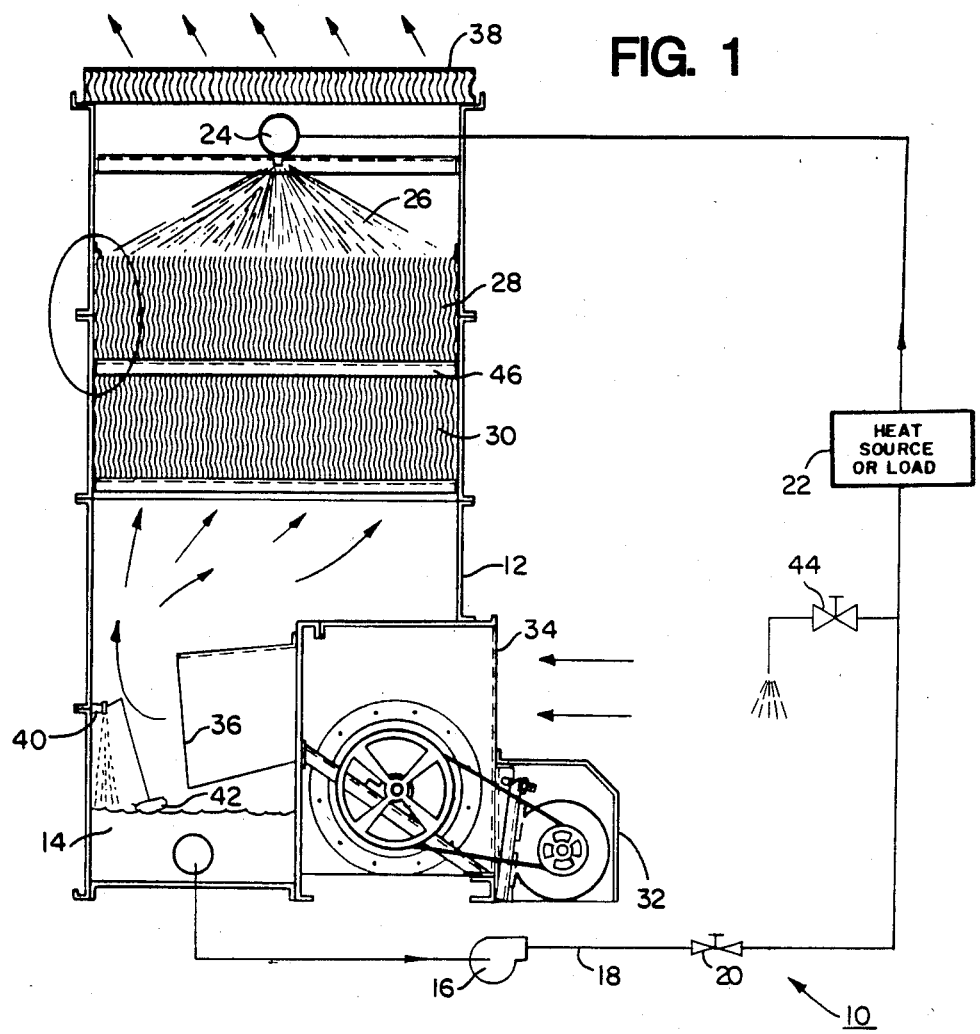
FIG. 1 is a schematic representation of a typical evaporative counterflow heat exchanger system in which the present invention can be used and in which the heat exchanger is illustrated partly in vertical section.

With reference to the drawings, wherein like numerals represent like elements, there is shown in FIG. 1 an evaporative counterflow heat exchanger system 10 in which the wet deck fill made according to the present invention can be used. It should be understood that the heat exchanger system itself does not comprise the present invention. Rather, the system is illustrated to help explain the use of the wet deck fill of the present invention.

Evaporative heat exchanger 12 is, for example, a cooling tower in which water contained in the sump area 14 is pumped by pump 16 through conduit 18 and valve 20 to a heat source or load 22, such as an air conditioning unit, for example. Typically, the water temperature in the sump is about 85° F. After it is circulated to the heat source or load, the water is heated approximately 10° to 20° F. as it cools the equipment forming the heat source or load. The water is then recycled through conduit 18 to the cooling tower and specifically to a water distributor such as a spray pipe 24.

Inside the cooling tower, the heated water is uniformly sprayed as indicated at 26 from the distribution system over the entire top surface of the upper wet deck fill layer 28. The spray falls onto the fill where it is spread into a thin film. The water travels by gravity down the wet deck fill sheets and, often, as illustrated, through a lower wet deck fill layer 30. The number of wet deck fill layers arranged above and below each other can be determined based upon the design parameters of a particular installation. The fill made according to the present invention is adapted primarily for countercurrent flow path systems and is particularly well suited both for use in single deck and multiple deck arrangements.

From the lower deck fill, the water flows into an air plenum area where it falls in a cooled state to sump 14. The water is continuously recycled through the cooling tower and very little is lost, only on the order of about 5% of the total circulated flow. When water is lost, so that the level of water in sump is below a predetermined level, fresh water make-up valve 40 is opened by action of float assembly 42. In this way, a sufficient amount of water is always present in the sump. The small amount of water lost during circulation is a result of the evaporation of a portion of the water and the removal of an additional portion of the water through a continuous blow down assembly 44 which helps to regulate the concentration of impurities in the water.

A blower assembly 32 causes cool air to enter blower inlet 34 and exit blower outlet 36 where it is directed upwardly toward the wet deck fill. The air flows counter-current to the descending water between the wet deck fill sheets, through the spray region and finally exits through the mist eliminators or drift eliminators 38 into the atmosphere. Particularly effective drift eliminators are set forth in copending U.S. patent application Ser. No. 499,741, filed May 31, 1983, and now U.S. Pat. No. 4,500,330, in which the inventor of the present wet deck fill sheet is named as a coinventor.

Typically, air entering the cooling tower has a wet bulb temperature of 78° F. By the time it passes through the plenum area, the wet deck fill, the water distribution system and the drift eliminator, the air is typically saturated with water and has a wet bulb temperature of about 90° F. The heat transfer occurs throughout the cooling tower, but the primary area of heat transfer is in the wet deck fill area where there is maximum air-water contact and the maximum amount of evaporation. The latent heat of vaporization necessary for evaporation is what cools the circulating water. The best way to obtain maximum evaporation is to expose as much of the water as possible to the air flow for the longest possible time.

The wet deck fill is the heart of the cooling tower and is also the single highest cost item in the manufacture of the tower. Accordingly, one primary object which was achieved in connection with the present invention was the production of a wet deck fill which maximizes the air-water contact area and dwell time while minimizing the air resistance and reducing the cost of the fill. These objectives have been achieved throughout a wide range of operating water flow rates, air flow rates, and various depths of fill that are encountered in the design of a complete cooling tower product line.

Figure 1A:
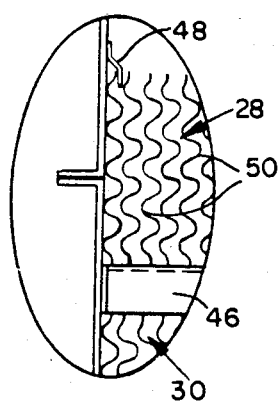
FIG. 1A is a detail taken from the oval area of FIG. 1 showing the mounting of wet deck fill sheets in the heat exchanger.

Wet deck fill layers 28 and 30 illustrated in FIGS. 1 and 1A are comprised of a plurality of wet deck fill sheets 50 made in accordance with the present invention. Sheets 50 are both self aligning and self spacing as illustrated most clearly in FIG. 5. The sheets are stacked in an upright vertical position between the side walls of the cooling tower and are supported at the bottom by horizontal support members typically spaced about three feet apart. One such horizontal support member 46 is illustrated in FIGS. 1 and 1A. It is not necessary to cement the fill sheets together, since as they bear against one another they form a rigid, self-standing unit when placed adjacent to each other between the walls of the cooling tower. A deflector 48 is used to prevent water from becoming trapped between the first fill sheet and the wall of the cooling tower.

When the fill sheets of the present invention are assembled in the cooling tower they are rigid enough to support a person standing on a support, such as a piece of plywood approximately 30 inches in length by 30 inches in width. This is advantageous in performing routine maintenance, such as cleaning the water distribution system.

Figures 2, 2A:
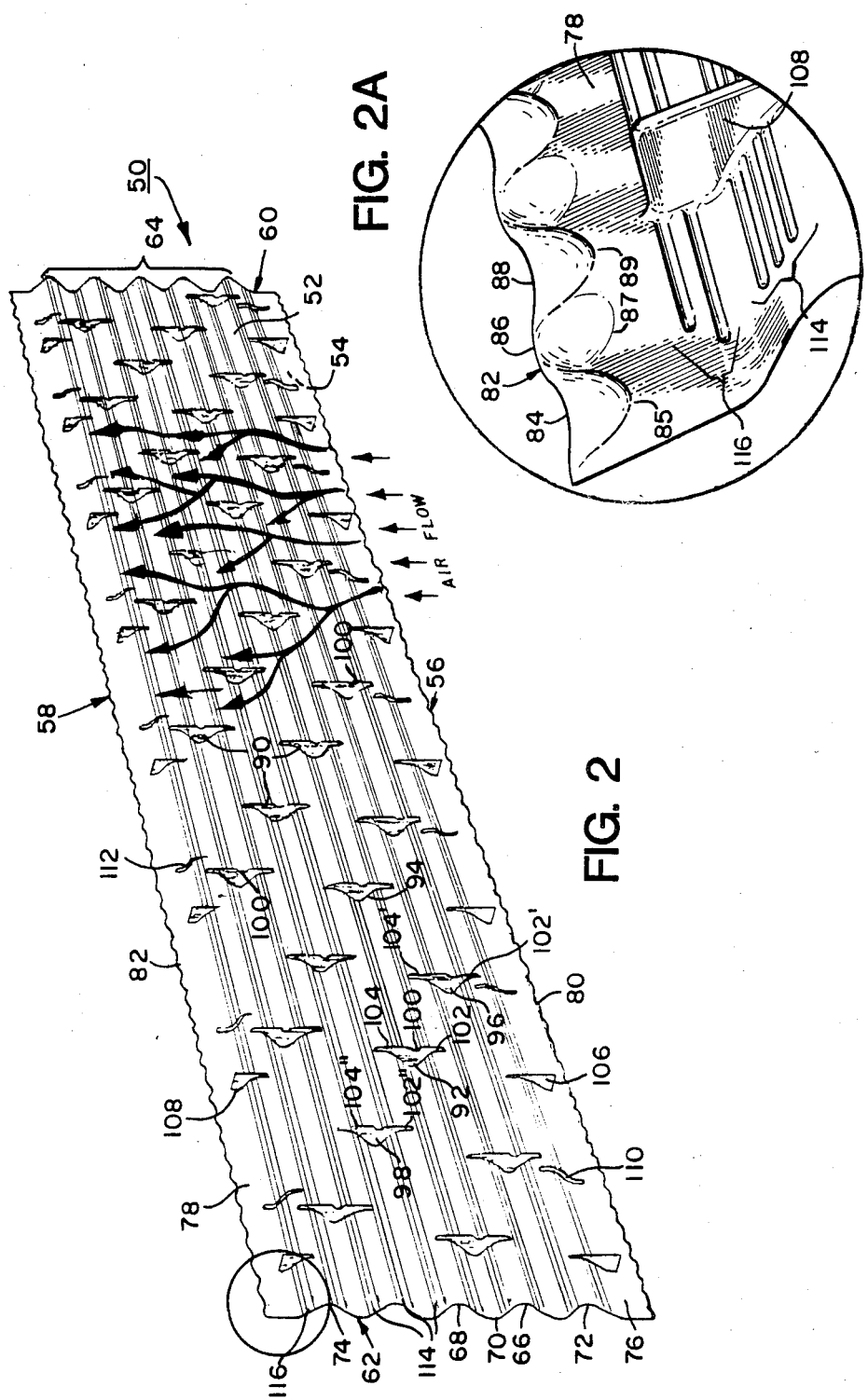
FIG. 2 is a front perspective view of a wet deck fill sheet in accordance with the present invention.
FIG. 2A is a front perspective view of an enlarged portion of the wet deck fill sheet according to the present invention taken from the circled area of FIG. 2.
Figure 5:
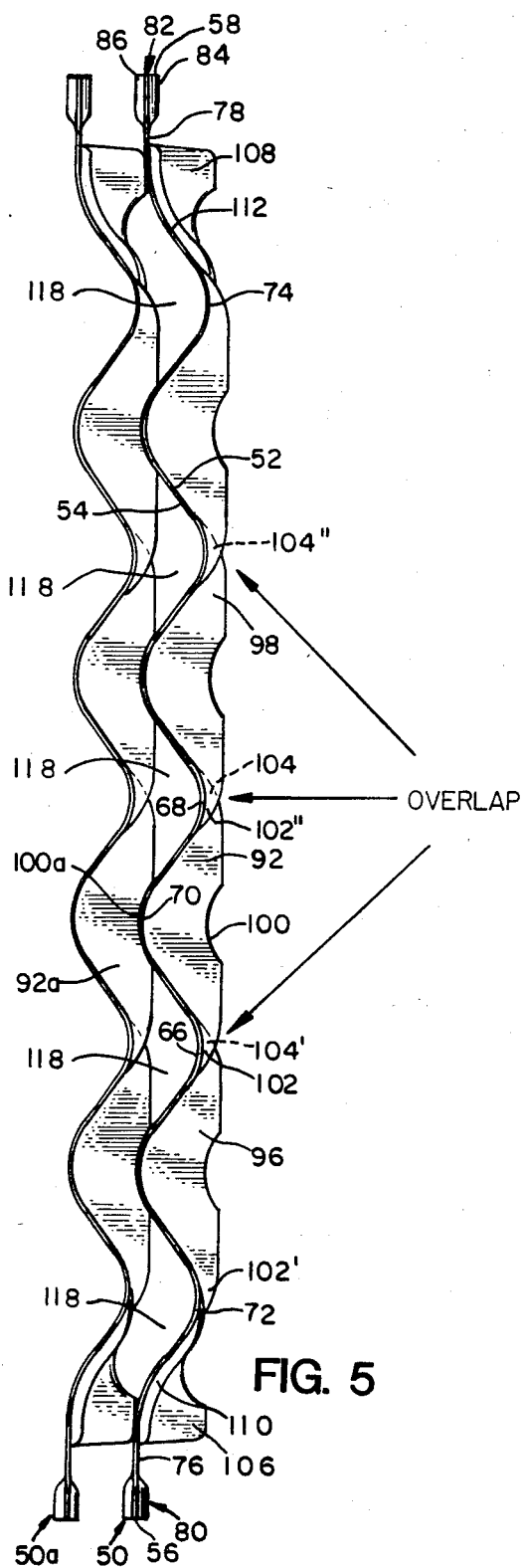
FIG. 5 is a side elevation of two of a plurality of adjacent fill sheets according to the present invention abutting each other as they would be arranged to form the wet deck fill in a heat exchanger.

An entire fill sheet 50 made in accordance with the present invention is best illustrated in FIG. 2. FIGS. 2A and 5 also show the details of the fill sheet. Fill sheet 50 includes a front major face 52 and a rear major face 54, as well as a bottom edge 56, a top edge 58 and side edges 60 and 62.

Preferably, major faces 52 and 54 of sheet 50 are in the form of multiple major face corrugations 64 extending along the length of the sheet from side to side and being generally parallel to the top and bottom edges of the sheet. Each major face corrugation includes a peak, such as peak 68 and an adjacent valley, such as valley 70. For ease of explanation, a peak will be considered to be the apex of a convex corrugation extending from front face 52 of the sheet. Likewise, a valley shall be considered the concave portion of a corrugation when viewing front face 52 of the sheet. It should be clear that if the corrugations are viewed from the perspective of rear face 54 of the sheet that the peaks and valleys will be reversed compared to the perspective when viewed from front face 52. That is, a front face peak is a rear face valley, and a front face valley is a rear face peak.

As illustrated in FIG. 2, valley 70 is located between adjacent peaks 66 and 68. This is a typical relationship for corrugations from bottom peak 72 adjacent to bottom edge 56 of the sheet to top peak 74 adjacent to top edge 58 of the sheet. Thus, each peak is connected to an adjacent valley and vice versa by a sloping wall forming a compound curve or generally sinusoidal shape to create the corrugations.

Bottom peak 72 and top peak 74 are connected to valleys which merge with substantially vertical planar portions 76 and 78, respectively, adjacent to bottom and top edges 56 and 58, respectively, as best illustrated in FIGS. 2 and 5. It is important that the bottom and top peaks adjoin valleys which merge with the substantially vertical portions so that the bottom and top edges of one sheet are spaced a uniform horizontal distance from the bottom and top edges, respectively, of adjacent sheets. The significance of this arrangement will become apparent hereinafter.

Formed in bottom edge 56 are a plurality of transverse corrugations 80, so denominated because corrugations 80 are transverse to the length of the sheet from side 60 to side 62. In a similar manner, transverse corrugations 82 are formed in top edge 58. Preferably, transverse corrugations 80 and 82 are perpendicular to horizontal major face corrugations 64. While improved performance could be achieved if transverse corrugations are formed only in the bottom edge or the top edge, better performance is achieved in accordance with the preferred embodiment in which transverse corrugations are formed in both the bottom and top edges.

Since the transverse corrugations formed in the bottom edge are substantially identical to the transverse corrugations formed in the top edge, the transverse corrugations will be described in detail only with respect to top edge corrugations 82. Referring to FIGS. 2A and 5, each of top edge transverse corrugations 82 comprises a peak 84 and valley 86 when viewed from the perspective of front face 52. Adjacent peaks adjoin adjacent valleys. Thus, for example, in FIGS. 2A, valley 86 is between peaks 84 and 88.

Each transverse corrugation 82 includes a proximal end portion adjacent the body of the sheet and a distal end portion adjacent the edge of the sheet. It is preferred that the proximal end portion of each corrugation converge toward substantially vertical planar portion 78 of the sheet. This is illustrated in FIG. 2A by proximal ends 85, 87 and 89 of peaks and valleys 84, 86 and 88, respectively, converging toward and merging with substantially vertical planar portion 78. The convergence of peak 84 and valley 86 with portion 78 is also illustrated in FIG. 5.

As illustrated in the drawings, the transverse corrugations have a small amplitude and frequency when compared to the major face corrugations. It is important to maintain a horizontal space between adjacent sheets to provide for optimum air and water flow characteristics. Accordingly, transverse corrugations 80 and 82 should extend from the major faces of the substantially vertical planar portions 76 and 78, respectively, a distance from about 15 percent to about 34 percent of the distance between adjacent sheets when the sheets are assembled to form a wet deck fill. Accordingly, about 65 to about 85 percent of the space between the sheets would be unimpeded by the transverse edge corrugations.

Several important functions are attributed to top edge transverse corrugations 82. They primarily function as liquid distributors. An important factor in maximizing the performance of a wet deck fill is to assure uniform wetting of both sides of the fill sheet without developing dry areas. This provides for the maximum air-water contact and, therefore, maximum cooling efficiency.

Figure 3:
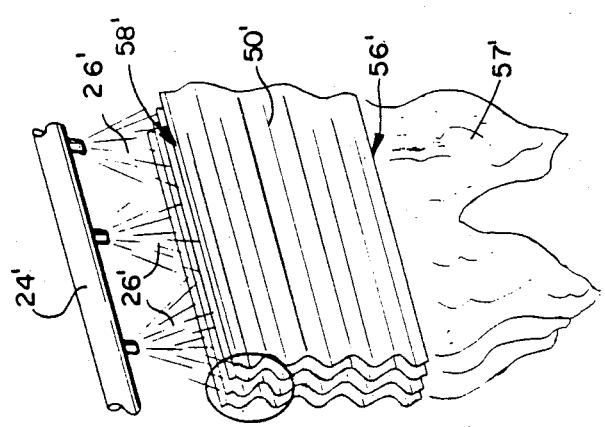
FIG. 3 is a front perspective view of a portion of wet deck fill using prior art wet deck fill sheets, which illustrates the nonuniform water distribution from the bottom edge of the fill.
Figure 3A:
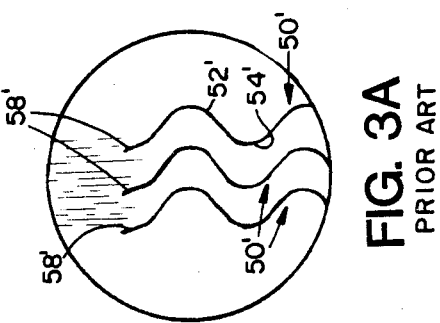
FIG. 3A is an enlarged side elevation view of the prior art arrangement taken from the circled area of FIG. 3.

Prior art corrugated deck fill sheets are illustrated in FIGS. 3 and 3A. Typical commercial prior art sheets 50' are illustrated in the process of being sprayed with water spray 26' from distributor 24'. As best seen in FIG. 3A, because the top edges 58' of the prior art sheets have straight edges, rather than edges having transverse corrugations as in the present invention, the top edges are subject to leaning, bending and deflection from the water spray. This is a common occurrence and, particularly over a period of time, the water spray would often be deflected almost totally down front face 52' of each sheet, rather than being deflected also down rear face 54' of each sheet.

Figure 4A:
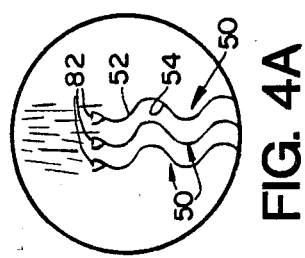
FIG. 4A is an enlarged side elevation of the fill taken from the circled area of FIG. 4.

In contrast with the prior art and as best illustrated in FIG. 4A, transverse corrugations 82 along top edges 58 of sheets 50 according to the present invention strengthen the top edges and prevent the leaning, bending and deflection problem. In addition, they present substantially greater face area and linear surface to the water spray so that the water is more uniformly distributed on both major faces 52 and 54 of the sheet.

Due to top edge corrugations 82, more water is collected on and distributed over both major faces of the fill sheets, rather than ineffectually falling between the sheets as is often the case with the prior art fill sheets. The uniform distribution of water over both major faces of the fill sheets is promoted by the above-described gradual and smooth convergence of transverse corrugations 82 into substantially vertical planar portion 78. Water flow is enhanced by the gentle curves of the transverse corrugations themselves and where the transverse corrugations join with the substantially planar vertical portions of the sheet. If the convergence of the transverse corrugations with the sheet were characterized by sharp corners or paths which would require the water to change directions abruptly, the water would have a tendency to be stripped from the faces of the sheets by the countercurrent of air.

Top edges 58 of fill sheets 50 according to the present invention are straight and erect, without having the customary unintended waviness and leaning of prior art fill sheets. In addition to providing stiffness necessary to allow a person to stand on the fill deck for maintenance purposes, the fill sheets of the present invention also have a better aesthetic appearance, helpful in the marketing area.

Bottom transverse corrugations 80 on sheets 50 of the present invention also significantly improve the performance of the fill sheets compared to prior art fill sheets. With typical commercial prior art fill sheets as best illustrated in FIG. 3, the straight, uncorrugated bottom edges 56 cause the water to be distributed in nonuniform sheets as indicated at 57' as the water film leaves the wet deck fill. As depicted in FIG. 3, the prior art fill does not channel the water sheets leaving the fill into any particular pattern. Rather, the water flows unevenly from bottom edges 56'. The uneven water distribution from the uncorrugated bottom edge of prior art sheets is aggravated when the lower edges become bent and wavy as the sheets are used over a prior of time.

Figure 4:
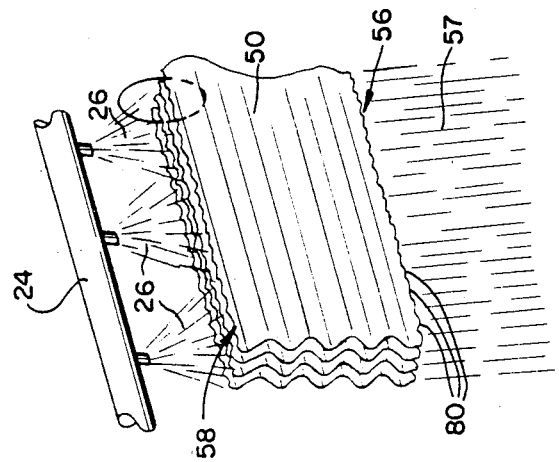
FIG. 4 is a front perspective view of a portion of wet deck fill using wet deck fill sheets according to the present invention, which illustrates the uniform water distribution from the bottom edge of the fill.

In contrast, referring to FIG. 4, the corrugated bottom edges 56 of fill sheets 50 according to the present invention collect the water film and direct the water into a multitude of individual and uniform separate streams as indicated at 57. This is aided by the gentle curves of the transverse corrugations themselves and the gradual convergence of the transverse corrugations with the substantially vertical portion 76. This has the advantage of a more uniform redistribution of water onto a lower deck or into the air plenum chamber of the cooling tower.

A further advantage of bottom transverse corrugations 80 is that they create lower resistance for air to enter the wet fill deck. On the underside of the bottom deck in the plenum chamber, the air is very turbulent. In the prior art, the turbulence causes sheets of water to be swept nearly horizontally. This results in the formation of water dams between the sheets which block the air entrance into the wet deck fill. While a certain amount of turbulence between the fill sheets within the deck fill is desirable, it is not desirable to impede the flow of air into the lower portion of the wet deck fill.

With the present invention, the streams of water leaving the lowermost deck fill layer are somewhat separated and tend to be slightly staggered out of the plane of vertical portion 76. This allows the air to pass through the water leaving the lower edge. Thus, the water streams are less affected or deflected by the air and water damming is not a problem. Air can enter into the spaces between the adjacent fill sheets. This reduces the air pressure drop and consequently lowers operating blower motor horsepower. This advantage was surprising, because the transverse corrugations actually reduce the free area between the sheets. Accordingly, one would normally expect the pressure drop to increase, rather than decrease as in the present invention.

The added strength provided by bottom edge transverse corrugations 80 is another advantage of this aspect of the present invention. The bottom edge transverse corrugations prevent the sheets from bending over where they rest on the support members. Often this area is overstressed both in operation, such as from icing of the water in cold weather, and during shipment. The corrugated bottom edge prevents stress cracks from developing.

Overall, the formation of transverse corrugations in the bottom and/or top edges of the fill sheets, and particularly their formation in both the bottom and top edges, significantly improves the thermal performance and structural strength of the wet deck fill, without increasing its weight.

The unique spacer design used with the fill sheets according to the present invention is best illustrated in FIGS. 2 and 5. The spacing of the sheets is accomplished by using a plurality of spacing means, such as main spacing ribs or spacers generally designated 90 in FIG. 2 and bottom and top edge spacers 106 and 108, respectively. As illustrated, spacers 90, 106 and 108 extend from front face 52 of fill sheet 50. However, there is no reason why the spacers could not extend from rear face 54 of sheet 50, if desired. The spacers should extend only from one face of the sheet so that the sheets can be properly aligned, easily assembled and conveniently shipped.

Spacers 90 provide several structural advantages and contribute to improved thermal performance of the wet deck fill. The spacers separate the fill sheets by a uniform predetermined horizontal distance. This is best illustrated in FIG. 5 in which sheet 50 is separated from sheet 50a by the spacers. The horizontal space between the sheets in the area of the major face corrugations is indicated by numeral 118 in FIG. 5. Preferably, at least the main spacers include a notch 100 having a shape to mate with an abutting valley of an adjacent sheet. This is illustrated by the abutment and interlocking of notch 100a of spacer 92a on fill sheet 50a with the rear face of valley 70 of sheet 50 in FIG. 5. The contoured notches prevent vertical misalignment of the sheets. This keeps the sinusoidal passage 118 between the sheets uniform at all times. This also results in the horizontal distance between adjacent sheets being the same at any point along the length and height of the sheet.

The relative location of spacers 90 in relation to each other is an important feature of the present invention. Spacers 90 are substantially vertical. Some of the spacers are in spaced horizontal alignment with each other. This is illustrated for example by the horizontal alignment of spacer 92 with spacer 94. The height of the spacers should be less than ½ of the height of the fill sheet and preferably sufficient to enable the spacers to bridge two adjacent peaks 64 and the valley between the peaks. Where prior art fill sheets included vertical spacers, the spacers extended either continuously substantially from the bottom to the top of the fill sheet and were regularly spaced horizontally along the length of the sheet or were of such a shape that they prevented the horizontal equalization of the air flow along the length of and between the sheets. In contrast, the present invention includes a plurality of short substantially vertical spacers in which each spacer is out of vertical alignment with a vertically adjacent spacer. This is illustrated for example by the relationship of spacer 92 to spacers 96 and 98 (FIG. 2).

Another important feature with respect to the spacers of the present invention is that they are so located with respect to each other that the flow of air between adjacent fill sheets may be and preferably is substantially equalized along the length of the sheet in a horizontal direction as the air flows from the bottom edge to the top edge of the sheets. This equalized air flow is illustrated by the air flow arrows in FIG. 2. In the same manner, water flow from the top of the fill toward the bottom of the fill is equalized whereby the water sheets are caused to be spread over substantially the entire surface of the sheet by the spacers. The staggered horizontal and vertical alignment of the relatively short discontinuous substantially vertical spacers 90 allow the horizontal flow of air and water, as contrasted to prior art fill sheets having horizontally spaced spacer ribs which extend substantially continously from the bottom to the top of the sheet or which block horizontal passage ways. Since there are no horizontal channels between the prior art spacing ribs, the air and water flow cannot be equalized along the length of the sheet.

The spacers according to the present invention have a streamlined shape to aid in the uniform distribution of air and water along the sheets. For example, with respect to spacer 92, it has a smooth curved bottom end 102 which converges with and adjoins front surface 52 of sheet 50 at peak 66. A top end portion 104 of spacer 92 is similarly shaped and converges with and adjoins front surface 52 of sheet 50 at peak 68. Moreover, the forwardmost portion of the spacers (the portion containing notch 100) is narrower than the most rearward portion of spacers adjoining the valleys. Additionally, the top and bottom ends of the spacers are narrower than the middle portion of the spacers.

Although adjacent vertical spacers are not in vertical alignment with each other, the spacers also provide a sheet strengthening and stiffening function by the way they are arranged. Preferably, one spacer extends over two peaks and one valley. Preferably, the adjacent horizontal and vertical spacers extend upwardly or downwardly beginning at the same peak.

This arrangement is best illustrated in FIG. 5 in which the bottom end 102 of spacer 92 partially vertically overlaps with the top end 104' of horizontally spaced spacer 96. Both bottom portion 102 of spacer 92 and top portion 104 of spacer 96 converge with peak 66. Likewise, top end 104 of spacer 92 partially vertically overlaps bottom end 102" of spacer 98 which is horizontally spaced from spacer 92. Thus, this aspect of FIG. 5 illustrates the arrangement wherein the bottom of one end of a spacer is in partial vertical overlapped spaced horizontal alignment with the top end of vertically adjacent spacers. The overlapped portions of horizontally adjacent spacers are overlapped a distance of from about 10 percent to about 25 percent, and preferably, about 14 percent of the length of a main spacer 90. The overlapped relationship allows the spacers to provide substantially the same strength as if they were vertically continuous from the bottom to the top of the sheet.

Also included along bottom corrugation 72 is a plurality of bottom edge spacers 106. Likewise, a plurality of top edge spacers 108 is provided along top corrugation 74. These bottom and top spacers are truncated compared to spacers 90 as illustrated so that they extend only over the peak of the major face corrugations 72 and 74 and into the valley from which extends the substantially vertical planar portions 76 and 78. The spacing and strengthening function of bottom and top spacers 106 and 108 are valuable in keeping the bottom and top edges of adjacent sheets spaced a uniform distance from each other, even under the force exerted by the forced air draft and water spray.

To further increase the stiffness of the bottom and top edges, transverse (with respect to the length of the sheet) stiffening ribs 110 and 112 are provided. Preferably, one transverse stiffening rib 110 is located between two adjacent bottom edge spacers 106. Preferably, one transverse stiffening rib 112 is located between two top edge spacers 108.

It is also preferred that spacers 90, 106 and 108, as well as transverse stiffening ribs 110 and 112, be formed integrally with sheet 50. By forming these elements integrally with the sheet so that they extend from front face 52, corresponding cavities will be formed in the rear face 54 of the sheets. Because of the spacer design and arrangement, the cavities formed in sheets according to the present invention do not significantly adversely affect the performance of the sheets, unlike the cavities formed in prior art sheets.

In prior art sheets having continuous vertical spacers, rear face cavities are in the shape of channels extending between the bottom and top edges of the sheet. With a vertically continuous prior art spacer, water seeks the channel formed in the rear surface of the sheet. Thus, the water is formed into heavy streams which bypass the effective surface area of the fill. As a result, water that channels in the cavities is not effectively cooled. In the present invention, the alternating staggered arrangement of the spacers continually forces water out of the cavities and back onto the working portion of the rear face of the fill sheet.

Further, since the spacers of the present invention are much thinner and have a streamlined, tapered shape, they eliminate the tendency of water to flow such that dry areas are formed on the sheets. If a dry area begins to develop, the offset staggered arrangement forces the water to redistribute along the length of the sheet. As the water runs around each spacer, the streamlined bottom ends such as 102, 102' and 102" encourage the water film to come back together as it leaves each spacer.

The formation of integral spacers in accordance with the present invention provides a distinct manufacturing and shipping advantage for the fill sheets of the present invention compared to prior art fill sheets. The shipping advantage is that multiple fill sheets can be made with the spacers in an identical orientation so that the sheets nest with each other and all edges are in substantial alignment. The spacers are so arranged with respect to the various edges that there is suitable edge stiffness and uniform spacing between adjacent sheets, even near the edges. Because of the staggered spacer relationship, the sheets can be cut to substantially any length without significant waste.

By contrast, with prior art fill sheets having a continuous vertical spacer design, the spacers must be within about two inches from the cut edges. Locating a spacer farther from the cut edge will allow adjacent sheets to touch on the side edges and thereby reduce thermal efficiency. Because of typical dimensions and design parameters involved with cooling towers and prior art wet deck fill, the vertical spacer at the opposite end must be between about $\frac{1}{2}$ inch and about 1 inch from the side edge so that the spacers on one sheet will not nest with the cavity formed by the spacers on the face of an adjacent sheet when the sheets are installed in the cooling tower. Typical prior art fill sheets have vertically continuous spacers located a distance of 7 to 12 inches apart. Accordingly, it was necessary to make a second edge cut during the manufacturing of each sheet to have a spacer close to both ends of the sheet. This results in about a 5% loss of material, depending on the sheet length, as well as increased labor costs.

When the sheets of the present invention are unpacked after being shipped in a tightly nested condition, the sheets merely have to be rotated 180 degrees within the same general vertical plane and placed adjacent to each other. It is only important that the spacers extending from the front face of one sheet abut the rear surface of the adjacent sheet. By making the 180 degree rotation, the spacers of one sheet will not nest with the cavities formed in the rear face of the adjacent sheet. At the same time, uniform spacing will be provided for the sheets along their entire length and height, including along their side edges.

Another aspect of the present invention relates to the use of air turbulence increasing and water spreading means formed on the sloping walls forming the peaks and valleys of the major face corrugations 64. This means preferably comprises a plurality of small corrugations 114 formed in the sloping walls as illustrated schematically in FIG. 2 and as enlarged in FIG. 2A. Corrugations 114 have a much smaller amplitude and frequence than major face corrugations 64. Corrugations 114 are generally parallel to the peaks and valleys and, accordingly, are generally parallel to the top and bottom edges of the sheet. Corrugations 114 form a minor obstruction causing sufficient turbulence between the air-water interface for improved heat transfer and evaporation. Corrugations 114 in effect increase the "hang time," that is, the time it takes the water to travel the vertical height of the fill sheet. The longer the warm water is exposed to the cooling air, the more cooling is accomplished.

In addition, and particularly in conjunction with vertical spacers 90, corrugations 114 spread the water film on the major faces uniformly horizontally along the length of the sheet. Corrugations 114 minimize the tendency of the water sheet to break into streams and thus they aid in eliminating dry spots.

Another set of small corrugations 116 are formed in the bottom and top substantially vertical planar portions 76 and 78. Such corrugations 116 are best illustrated in FIG. 2A. While these corrugations also increase the turbulence between the air-water interface for improved heat transfer and evaporation and aid in spreading the water horizontally, another important function is the stiffening function near the bottom and top edges. The importance of a strong top and bottom edge has been explained above.

Preferably, there are a total of five peaks and valleys (i.e., three peaks and two valleys or two peaks and three valleys) associated with small corrugations 114. Preferably, there are a total of three peaks and valleys (i.e., two peaks and one valley or one peak and two valleys) for small corrugations 116.

Preferably, the fill sheet according to the present invention is made of a thermoplastic polymeric resin that can be vacuum formed. The presently preferred material is polyvinylchloride. Other suitable thermoplastic materials which could be used, for example, include polystyrene, polypropylene and polyethylene. The thickness of the material used to form the sheets preferably varies between about 0.010 to about 0.030 inch. The presently preferred thickness is about 0.020 inch.

Typical exemplary dimensions for a wet deck fill sheet 50 according to the present invention and the elements associated therewith are as follows: length-from about 3 feet to about 12 feet; height-at least about 8 inches (2 peaks with associated valleys and bottom and top vertical portions and edges), and preferably about 16 inches (5 peaks with associated valleys and top and bottom vertical portions and edges); amplitude of major face corrugations (perpendicular distance between peak and valley)-about 11/16 inch; frequency of corrugations (distance between two adjacent peaks)-about 2-¾ inches; height of spacers 90-about 3-3/16 inches; extent of vertical overlap of horizontally spaced spacers (for example the overlap of bottom end 102 of spacer 92 with top end 104' of spacer 96)-7/16 inch; distance between horizontally aligned spacers (for example spacers 92 and 94)-about 5 inches to about 6 inches, center to center; horizontal distance between partially overlapping vertical portions of spacers 92 and 96-about 1-⅝ inches to about 2-⅝ inches center to center; distance between horizontally adjacent top and bottom edge spacers-about 6 inches center to center; distance between transverse rib 110 or 112 and edge spacer 106 or 108-about 3 inches; amplitude of small corrugations 114 and 116-about 0.040 inch; and frequency of turbulence increasing corrugations 114 and 116-about 0.22 inch.

The dimensions set forth above are approximate and may vary somewhat within the ranges set forth in the specification so long as the functional aspects are not adversely affected.

A wet deck fill made using wet deck fill sheets having all of the novel aspects of the present invention will result in improved water and air distribution so that there would be a uniform liquid film distributed across the entire fill sheet, thus eliminating dry spots and improving thermal performance. Air flow will be substantially equalized along the length of the sheet. With the uniform distribution of the air-water interface and the increased turbulence thereof, effective and efficient heat exchange occurs between the air and water in the wet deck fill, without adversely affecting the overall air pressure drop for the fill. The sheet will be structurally strengthened and stiffened without increasing the weight or cost of the sheet.

The present invention may be embodied in other specific forms without departing from the spirit or essential attributes thereof and, accordingly, reference should be made to the appended claims, rather than to the foregoing specification, as indicating the scope of the invention.

I claim:

1. A wet deck fill sheet adapted for assembly with a plurality of like sheets to form a wet deck fill, each sheet of material having front and rear major faces, top and bottom edges and side edges, the major faces having major face corrugations formed therein generally parallel to the top and bottom edges, each major face corrugation comprising sloping walls adjoining an adjacent peak and valley, at least one of the top and bottom edges having transverse corrugations formed therein transverse to the major face corrugations, the transverse corrugations having an amplitude less than the amplitude of the major face corrugations, and such that the transverse corrugations would extend from the major faces from about 15 percent to about 35 percent of the distance between adjacent sheets when the sheets are assembled to form a wet deck fill, whereby the transverse corrugations of one sheet do not contact the transverse corrugations of an adjacent sheet and such that liquid sprayed from above the sheet onto the sheet contacts and travels downwardly along both surfaces of the transverse corrugations.

2. A wet deck fill sheet according to claim 1 wherein both the top and bottom edges have the transverse corrugations formed therein.

3. A wet deck fill sheet according to claim 1 wherein the major faces include a substantially vertical planar portion between the major face corrugations and at least one of the top and bottom edges having the transverse corrugations.

4. A wet deck fill sheet according to claim 3 wherein the transverse corrugations have a proximal end portion and a distal end portion, and wherein the proximal end portion converges with the substantially vertical planar portion.

5. A wet deck fill sheet according to claim 4 wherein the major faces include a substantially vertical portion between the major face corrugations and both the top and bottom edges, and wherein both the top and bottom edges have transverse corrugations formed therein.

6. A wet deck fill sheet according to claim 5 wherein the major face corrugations include a plurality of turbulence increasing corrugations formed therein generally parallel to the top and bottom edges and wherein at least the major face corrugations adjacent to the top and bottom edges further include transverse stiffening ribs formed therein.

7. A wet deck fill sheet according to claim 5 wherein the sheet of material is a thermoplastic polymeric resin.

8. A wet deck fill sheet according to claim 1 further comprising a plurality of substantially vertical spacing means extending from the front face and extending across two peaks and a valley between the peaks for spacing the sheet a predetermined distance from an adjacent wet deck fill sheet, some of the spacing means being in spaced horizontal alignment, each spacing means being out of vertical alignment with a vertically adjacent spacing means, wherein the spacing means has top and bottom ends which join with an adjacent peak respectively, and wherein the bottom of one end of a spacing means is in partial vertical overlapped spaced horizontal alignment with the top end of vertically adjacent spacing means, such that the overlapped portions of horizontally adjacent spacing means are overlapped a distance of from about 10 percent to about 25 percent of the height of a spacing means whereby the flow of air between adjacent sheets may be substantially equalized along the length of the sheet in a horizontal direction as the air flows from the bottom edge to the top edge of the sheet.

9. A wet deck fill sheet according to claim 8 further comprising a plurality of turbulence increasing corrugations formed in the sloping walls of the peaks and valleys of the major face corrugations and being generally parallel to the major face corrugations.

10. A wet deck fill sheet according to claim 8 wherein each spacing means has a streamlined shape, being narrower at top and bottom ends than in a central portion.

11. A wet deck fill sheet according to claim 10 wherein the spacing means are integral with the sheet such that cavities are formed in the rear face corresponding to the location of spacing means extending from the front face.

12. A wet deck fill sheet according to claim 10 wherein a plurality of substantially identical sheets are nestable with each other, such that the spacing means of one sheet are receivable within the cavities formed in the rear face of an adjacent sheet when the spacing means and cavities are aligned.

13. A wet deck fill sheet according to claim 8 wherein the overlapped portions are overlapped a distance of about 14 percent of the height of a spacing means.

* * * * *